Dec. 4, 1934.    M. B. LINTON    1,982,678
PUSH ON AND PULL OFF GREASE GUN FITTING
Filed Jan. 26, 1931
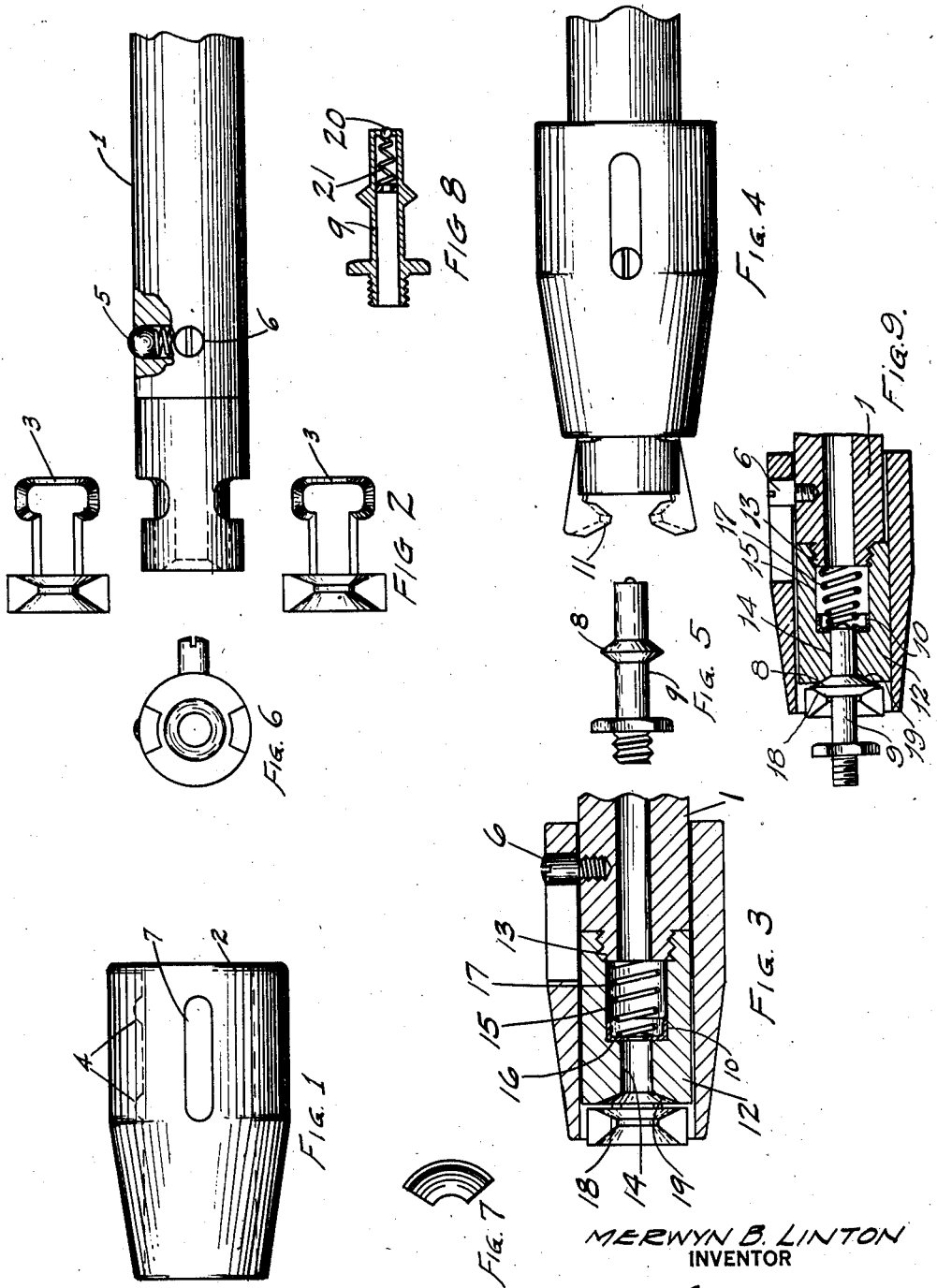
MERWYN B. LINTON
INVENTOR
BY George R. Ericson
ATTORNEY Patented Dec. 4, 1934

1,982,678

UNITED STATES PATENT OFFICE 1,982,678

PUSH ON AND PULL OFF GREASE GUN FITTING

Merwyn B. Linton, Chicago, Ill.

Application January 26, 1931, Serial No. 511,428

5 Claims. (Cl. 285—173)

It will be understood that the invention is susceptible of many modifications, and, accordingly, I do not wish to be limited in my protection, except as set forth in the accompanying claims.

This invention relates to pipe couplings and particularly to couplings and nipples for use in connecting grease guns to grease receiving devices. In previous devices of this character, a large number of different arrangements have been used, but there is considerable room for improvement in the way of providing a device capable of being quickly and conveniently connected and disconnected and which will form a tight seal against the leakage of lubricant.

It is an object of this invention to provide an inexpensive, rugged, durable, and novel nipple and coupling for the above described purpose. Other objects will appear from the following description and accompanying drawing, in which:

Figure 1 is a detail view showing the slip ring for locking the connection in place.

Figure 2 shows an exploded view of the outer member of the connection, the latches being turned with the axis toward the observer for better illustration thereof.

Figure 3 is a longitudinal section of the parts forming the outer member of the connection.

Figure 4 is a side view of the outer member of the connection, the sleeve being in the unlatched position.

Figure 5 is a side view of the inner member of the connector nipple.

Figure 6 is an end view of the parts shown in Figure 2.

Figure 7 is an end view of one of the latch members.

Figure 8 is a longitudinal sectional view of the nipple.

Figure 9 is a longitudinal sectional view showing the coupling and the nozzle in assembled relation.

The reference numeral 1 indicates the discharge conduit of a grease gun or, generally speaking, any conduit which is to be connected to another. A slidable sleeve 2 is carried on the end of the conduit 1 and is adapted to slide over the ends of the latches 3. Indents or annular grooves 4 are formed in the surface of the slip ring 2. A detent 5 is adapted to engage the depressions 4 to hold the slip ring in either one of its two positions. The extent of movement of the slip ring is controlled by a pin 6 which is carried by the conduit 1 and adapted to slide in the slot 7. The length of the slot accordingly controls the length of movement of the slip ring 2. The catches are provided with pivotal portions 11 at the outer ends which engage the annulus 8 on the nipple 9. It will be understood that this nipple may be the end of any conduit which is to be connected to the conduit 1, or the nipple may simply be screwed into a bearing to which lubricant is to be supplied in the same manner as the conventional grease gun nipple.

The conduit 1 carries a member 12 screw threaded as at 13 to its outer end. The member 12 is provided with a bore 14 of suitable diameter to receive the end of the nipple 9, and a second and larger bore 15 terminating in a shoulder 16 is formed on the inner end of the member 12. A cup leather 10 spring held against the shoulder 16 is carried in the bore 15, and a suitable spring 17 is provided to hold it in place. The distance from the shoulder 16 to the inner bevel 18 of the latches 3 is such that the cup leather 16 will be slightly displaced against the spring 17 when the nipple is engaged with the latches. It will be understood that the member 12 is provided with a recessed portion 19 to receive the outer end of the annulus 8. The nipple 9 may be provided, if desired, with a check valve 20 normally held in closed position by a spring 21.

The operation of the device is as follows:

When it is desired to engage the conduit 1 with the nipple 9, the sleeve 2 is withdrawn to the position shown in Figure 4, and the nipple 9 is inserted in the bore 14 until the annulus 8 engages the recess 19. The slip ring 2 is then pushed forward so that it slides over the outside of the latches 3, and the inner side 18 of the bevel on the latches engages the inner end of the annulus 8. As the latches engage the re-entrant portion of the annulus, the nipple is drawn further into the coupling, slightly displacing the sealing washer 10. In this position, the end of the cup leather 16 will rest on the end of the nipple 9 and form a fluid tight seal, and fluid may be passed through the conduit under pressure without danger of leakage.

When it is desired to disengage the coupling, the slip ring 2 is withdrawn by the operator and this ring first slides back and releases the latches 3 so that they may move outwardly and release the annulus 8 and the coupling can then be withdrawn.

From the above, it will be seen that the operator grasping the slip ring may engage the coupling and lock it in position by a single continuous rectilinear movement of the hand, also, when it is desired to disconnect the coupling, it may be unlocked and disengaged by a single rectilinear movement of the hand.

I claim:

1. In a device of the class described, a pair of conduits adapted to be connected and disconnected, a flexible sealing washer and a slip ring carried by one of said conduits, a latch controlled by said slip ring, a latch engaging means carried by the other of said conduits, said conduits being engageable or disengageable by a single rectilinear movement of said slip ring and a detent for yieldingly holding said slip ring in position.

2. In a device of the class described, a conduit comprising two portions threaded together and forming an annular recess therebetween, a sealing washer and a spring in said recess, said conduit having a slip ring on one end thereof, a slot in said slip ring extending longitudinally thereof, a projection mounted on said conduit and adapted to engage said slot, a pair of latches pivotally mounted on said conduit, said slip ring being adapted to hold said latches in closed position when the slip ring is advanced and being adapted to release said latches when slip ring is withdrawn, said slip ring serving to prevent the disassembly of said latches from said conduit as long as said projection is in said slot.

3. In a device of the class described, a conduit comprising two portions forming an annular recess therebetween, a sealing washer in said recess, said conduit member having a slidable ring mounted on one end thereof, a longitudinal slot in said ring, a pin carried by said conduit and engaging said slot for limiting the movement of said ring, a spring detent for yieldably holding said ring in any one of a plurality of positions, a pair of latch members carried on the end of said conduit, said ring holding said latch members in position, said latch members being adapted to be moved to engaged or disengaged position by a movement of said ring.

4. A coupling device comprising a conduit member having a nipple receiving opening therein, sealing means at the inner end of said nipple receiving opening, said sealing means being constructed and arranged to engage the end of the nipple in fluid tight relation and to be pressed into closer engagement by the pressure of the fluid in the conduit, a nipple comprising a longitudinal portion adapted to enter said nipple receiving portion and to contact with said sealing means, said nipple having a re-entrant portion adjacent said cylindrical portion, latching means carried by said conduit member and adapted to engage the re-entrant portion of said nipple, and a slip ring carried by said conduit for controlling said latch means.

5. A coupling device comprising a conduit member having a nipple receiving opening therein, sealing means at the inner end of said nipple receiving opening, said sealing means comprising a flexible sealing washer adapted to engage the end of the nipple in fluid tight relation, a nipple comprising a longitudinal portion adapted to enter said nipple receiving portion and to contact with said sealing means, said nipple having a re-entrant portion adjacent said cylindrical portion, latching means carried by said conduit member and adapted to engage the re-entrant portion of said nipple, and a slip ring carried by said conduit for controlling said latch means, said re-entrant portion and said latch means being constructed and arranged to draw said nipple into said conduit against the sealing means upon engagement of said latches.

MERWYN B. LINTON.